(12) United States Patent
Huang et al.

(10) Patent No.: US 9,591,656 B2
(45) Date of Patent: Mar. 7, 2017

(54) METHOD, APPARATUS AND LTE TERMINAL FOR DETERMINING CHANNEL QUALITY INDICATOR VALUE

(71) Applicants: ZTE Corporation, Shenzhen, Guangdong (CN); ZTE Microelectronics Technology Co., Ltd, Shenzhen (CN)

(72) Inventors: Meiying Huang, Shenzhen (CN); Tianmin Ren, Shenzhen (CN)

(73) Assignees: ZTE CORPORATION, Shenzhen, Guangdong (CN); ZTE MICROELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 53 days.

(21) Appl. No.: 14/429,426

(22) PCT Filed: Aug. 21, 2013

(86) PCT No.: PCT/CN2013/082000
§ 371 (c)(1),
(2) Date: Jun. 11, 2015

(87) PCT Pub. No.: WO2014/044106
PCT Pub. Date: Mar. 27, 2014

(65) Prior Publication Data
US 2015/0296524 A1 Oct. 15, 2015

(30) Foreign Application Priority Data

Sep. 19, 2012 (CN) .......................... 2012 1 0348953

(51) Int. Cl.
*H04W 72/08* (2009.01)
*H04W 24/02* (2009.01)
(Continued)

(52) U.S. Cl.
CPC ........ *H04W 72/082* (2013.01); *H04B 7/0404* (2013.01); *H04B 7/0689* (2013.01);
(Continued)

(58) Field of Classification Search
CPC .. H04B 7/0404; H04B 7/0486; H04B 7/0632; H04B 7/0639; H04B 7/0689;
(Continued)

(56) References Cited

U.S. PATENT DOCUMENTS

2009/0052357 A1    2/2009  Suo
2009/0245408 A1*  10/2009  Mujtaba ............... H04B 7/0417
                                                           375/267
2009/0274204 A1*  11/2009  Chen .................... H04L 1/0027
                                                           375/228

FOREIGN PATENT DOCUMENTS

CN     101127747 A     2/2008
CN     101132227 A     2/2008
(Continued)

OTHER PUBLICATIONS

International Search Report in international application No. PCT/CN2013/082000, mailed on Nov. 28, 2013.
(Continued)

*Primary Examiner* — Timothy J Weidner
(74) *Attorney, Agent, or Firm* — Oppedahl Patent Law Firm LLC

(57) ABSTRACT

A method, an apparatus and an LTE terminal for determining a CQI value are provided and belongs to the field of mobile communications. The method for determining a CQI value includes that a terminal establishes a correspondence between an effective SNR threshold and a CQI value, the terminal acquires a mean effective SNR in a downlink subframe specified bandwidth, and the terminal determines, according to the acquired mean effective SNR and the (Continued)

correspondence, a CQI value to be sent to a base station. The technical scheme of the disclosure is applicable to various different frequency selective fading channels and different signal transmission modes and can be implemented in a low-complexity way.

9 Claims, 1 Drawing Sheet

(51) Int. Cl.

| | | |
|---|---|---|
| *H04L 5/26* | (2006.01) | |
| *H04L 1/20* | (2006.01) | |
| *H04B 17/336* | (2015.01) | |
| *H04B 17/26* | (2015.01) | |
| *H04B 17/24* | (2015.01) | |
| *H04B 7/06* | (2006.01) | |
| *H04B 7/04* | (2006.01) | |
| *H04L 5/00* | (2006.01) | |
| *H04L 1/00* | (2006.01) | |

(52) U.S. Cl.
CPC .............. *H04B 17/24* (2015.01); *H04B 17/26* (2015.01); *H04B 17/336* (2015.01); *H04L 1/0019* (2013.01); *H04L 1/0026* (2013.01); *H04L 5/006* (2013.01); *H04L 5/0007* (2013.01); *H04W 24/02* (2013.01); *H04L 1/0003* (2013.01); *H04L 1/0009* (2013.01)

(58) Field of Classification Search
CPC ........ H04B 17/21; H04B 17/24; H04B 17/26; H04B 17/309–17/373; H04L 1/0001; H04L 1/0003; H04L 1/0009; H04L 1/0019; H04L 1/0026; H04L 5/006; H04L 5/0007; H04W 24/02; H04W 72/08–72/087
See application file for complete search history.

(56) References Cited

FOREIGN PATENT DOCUMENTS

| | | |
|---|---|---|
| CN | 101282564 A | 10/2008 |
| CN | 101662340 A | 3/2010 |
| CN | 102037697 A | 4/2011 |
| JP | 2005057710 A | 3/2005 |

OTHER PUBLICATIONS

English Translation of the Written Opinion of the International Search Authority in international application No. PCT/CN2013/082000, mailed on Nov. 28, 2013.
Discussion CQI offset for relative throughput, Oct. 2009.

* cited by examiner

METHOD, APPARATUS AND LTE TERMINAL FOR DETERMINING CHANNEL QUALITY INDICATOR VALUE

TECHNICAL FIELD

The disclosure relates to the field of mobile communications, and particularly to a method, an apparatus and an LTE terminal for determining a channel quality indicator (CQI) value.

BACKGROUND

In a radio communication system, the quality of the signal received by a User Equipment (UE) depends on the channel quality and the noise intensity of a serving cell and the interference intensity of neighboring cells. When certain transmitting power is given, in order to optimize the capacity and the coverage of a system, the transmission rate of a transmitter should go to match the channel capacity of each user to the greatest extent, that is, a UE sends more data when the quality of the signals received is good and sends less data when the quality of the signals received is poor. The transmission rate is changed by adjusting a Modulation and Coding Scheme (MCS). A low-order MCS is used when the channel quality is poor so as to tolerate interference and noise of higher intensity, however, the transmission rate is low in this case. A high-order MCS, by which high transmission rate can be achieved, is sensitive to interference and noise and is therefore employed when the quality of a channel is good. This technology is called Adaptive Modulation Coding (AMC) based link adaptation technology.

In a Long Term Evolution (LTE) communication system, an eNodeB selects a suitable modulation scheme and a proper coding rate according to a Channel Quality Indicator (CQI) fed back by a UE so as to improve the transmission rate and the throughput of the system. The CQI is a supportable data rate indicator given after taking the signal-to-noise ratio (SNR) level of the current channel and the performance of a receiver into consideration. The selected CQI is calculated based on the quality of a downlink received signal. It should be noted that a CQI is the highest-order MCS capable of guaranteeing a Block Error Rate (BLER) not to exceed 10% in the condition of the current channel and noise, rather than a direct indicator of a downlink Signal-to-Noise Ratio (SNR).

In the conventional technologies, as a wireless channel has a frequency selective fading characteristic in a multi-path channel and the SNR of each sub-carrier is different in an OFDM based multi-carrier communication system, it is complicated to calculate a CQI.

SUMMARY

The technical problem to be addressed by the disclosure is to provide a method, an apparatus and an LTE terminal for determining a CQI value, which are applicable to various different frequency selective fading channels and different signal transmission modes and can be implemented in a low-complexity way.

To address the foregoing technical problem, the following technical schemes are provided in the disclosure.

A method for determining a CQI value includes that:

a terminal establishes a correspondence between an effective SNR threshold and a CQI value;

the terminal acquires a mean effective SNR in a downlink subframe specified bandwidth; and the terminal determines, according to the acquired mean effective SNR and the correspondence, a CQI value to be sent to a base station.

In the method, the process that the terminal acquires a mean effective SNR in a downlink subframe specified bandwidth may include that:

the terminal calculates a mean SNR and a standard SNR deviation in the downlink subframe specified bandwidth;

the terminal calculates an effective SNR in the downlink subframe specified bandwidth according to the mean SNR and the standard SNR deviation; and the terminal determines the mean effective SNR in the downlink subframe specified bandwidth according to the effective SNR.

In the method, the terminal, when in a single transmitting antenna or multi-antenna transmit diversity or one-layer spatial multiplexing mode, calculates the mean SNR represented as meanSNR(i) and the standard SNR deviation represented as stdSNR(i) in the ith downlink subframe specified bandwidth using the following formulas 1 and 2:

$$meanSNR(i) = \frac{1}{A} \sum_{k,l \in K,L} \frac{\sum_{rx=0,tx=0}^{rx=N_{Rx}-1,tx=N_{Tx}-1} |h_{rx,tx}(i,k,l)|^2}{N_0}$$ Formula 1

$$stdSNR(i) =$$ Formula 2
$$\sqrt{\frac{1}{A} \sum_{k,l \in K,L} \left( \frac{\sum_{rx=0,tx=0}^{rx=N_{Rx}-1,tx=N_{Tx}-1} |h_{rx,tx}(i,k,l)|^2}{N_0} - meanSNR(i) \right)^2}$$

in which $N_{Rx}$ the number of the receiving antennas of the terminal; $N_{Tx}$ represents the number of the transmitting antennas of the base station; $h_{rx,tx}(i,k,l)$ represents the channel coefficient on a (rx-tx) antenna pair of the kth sub-carrier on the lth Orthogonal Frequency Division Multiplexing (OFDM) symbol in the ith downlink sub-frame; K and L respectively represent a sub-carrier set and an OFMD symbol set for calculation in a downlink subframe specified bandwidth; and A represents the number of the sub-carriers for calculating a mean SNR and a standard SNR deviation in a downlink subframe specified bandwidth.

In the method, the terminal, when in a two-layer spatial multiplexing mode, calculates the meanSNR(i) and the stdSNR(i) in the ith downlink subframe specified bandwidth using the following formulas 3 and 4:

$$stdSNR(i) = \sqrt{\frac{1}{A} \sum_{k \in \wedge} (SNR_{l,k} - meanSNR(i))^2}$$ Formula 4 in which $\wedge$ represents a set of sub-carriers for calculating the mean SNR and the standard SNR deviation in the ith downlink sub-frame, the rank of $\wedge$ is A; and $SNR_{l,k}$ represents the SNR value of the lth layer in the kth sub-carrier, in which l=0,1.

In the method, the terminal calculates, according to the meanSNR(i) and the stdSNR(i), the effective SNR represented as $SNR_{eff}(i)$ in the downlink subframe specified bandwidth using the following formula 5:

$$SNR_{eff}(i) = meanSNR(i) - stdSNR(i)$$ Formula 5

In the method, when in the single transmitting antenna or multi-antenna transmit diversity or one-layer spatial multiplexing mode, the terminal determines, according to the $SNR_{eff}(i)$, the mean effective SNR represented as $\overline{SNR}(i)$ in the downlink subframe specified bandwidth using the following formulas 6 and 7:

$$SNR_{eff}(i)=\min((1+scale)\cdot\overline{SNR}(i-1),SNR_{eff}(i)) \quad \text{Formula 6}$$

$$\overline{SNR}(i)=(1-\alpha)\cdot\overline{SNR}(i-1)+\alpha\cdot SNR_{eff}(i) \quad \text{Formula 7}$$

in which $\alpha$ and scale are constants.

In the method, when in the two-layer spatial multiplexing mode, the terminal calculates, according to the $SNR_{eff}(i)$, the mean effective SNR represented as $\overline{SNR}(i)$ in the downlink subframe specified bandwidth using the following formulas 6, 7 and 8:

$$SNR_{eff}(i)=\min((1+scale)\cdot\overline{SNR}(i-1),SNR_{eff}(i)) \quad \text{Formula 6}$$

$$\overline{SNR}(i)=(1-\alpha)\cdot\overline{SNR}(i-1)+\alpha\cdot SNR_{eff}(i) \quad \text{Formula 7}$$

$$\overline{SNR}(i)=\beta\cdot\overline{SNR}(i) \quad \text{Formula 8}$$

in which scale, $\alpha$ and $\beta$ are constants.

The process that the terminal determines, according to the acquired mean effective SNR and the correspondence, a CQI value to be sent to a base station may include that:

when the acquired mean effective SNR is greater than effective SNR threshold M but smaller than effective SNR threshold N, the terminal determines a CQI value corresponding to the effective SNR threshold M as the CQI value to be sent to the base station.

An apparatus for determining a CQI value includes:

an establishment module configured to establish a correspondence between an effective SNR threshold and a CQI value;

an acquisition module configured to acquire a mean effective SNR in a downlink subframe specified bandwidth; and a determination module configured to determine, according to the acquired mean effective SNR and the correspondence, a CQI value to be sent to a base station.

An LTE terminal includes the foregoing apparatus for determining a CQI value.

The disclosure has the following beneficial effects:

in the foregoing schemes, a terminal first establishes a correspondence between an effective SNR threshold and a CQI value and then acquires a mean effective SNR in a downlink subframe specified bandwidth and determines, according to the acquired mean effective SNR and the correspondence, a CQI value to be sent to a base station. The technical scheme of determining a CQI value is applicable to various different frequency selective fading channels and different signal transmission modes and can be implemented in a low-complexity way and therefore can meet a high-throughput data transmission requirement in an LTE system.

DETAILED DESCRIPTION

To set forth the technical problem to be addressed by the disclosure and the technical schemes and advantages of the disclosure more clearly, the disclosure is described below in detail with reference to specific embodiments when taken in conjunction with accompanying drawings.

Aiming at the problem existing in the conventional art that it is complicated to calculate a CQI, the disclosure provides a method, an apparatus and an LTE terminal for determining a CQI value, which are applicable to various different frequency selective fading channels and different signal transmission modes and can be implemented in a low-complexity way.

Figure 1:
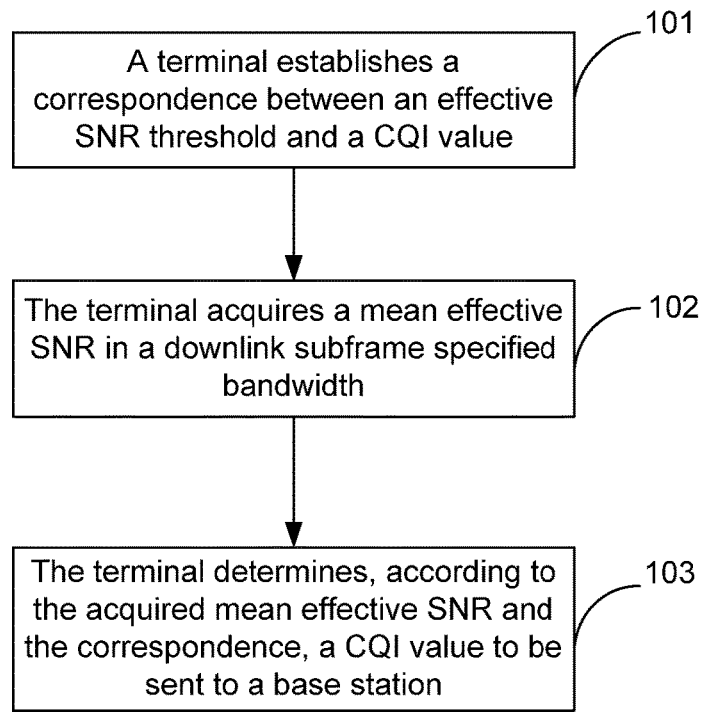
FIG. 1 is a flowchart illustrating a method for determining a CQI value according to an embodiment of the disclosure.

FIG. 1 is a flowchart illustrating a method for determining a CQI value according to an embodiment of the disclosure, and as shown in FIG. 1, the method provided in the embodiment includes that:

Step 101: a terminal establishes a correspondence between an effective SNR threshold and a CQI value;

Step 102: the terminal acquires a mean effective SNR in a downlink subframe specified bandwidth; and Step 103: the terminal determines, according to the acquired mean effective SNR and the correspondence, a CQI value to be sent to a base station.

In the embodiment of the disclosure, a terminal first establishes a correspondence between an effective SNR threshold and a CQI value and then acquires a mean effective SNR in a downlink subframe specified bandwidth and determines, according to the acquired mean effective SNR and the correspondence, a CQI value to be sent to a base station. The technical scheme for determining a CQI value provided in the embodiment of the disclosure is applicable to various different frequency selective fading channels and different signal transmission modes and can be implemented in a low-complexity way and therefore can meet a high-throughput data transmission requirement in an LTE system.

Figure 2:
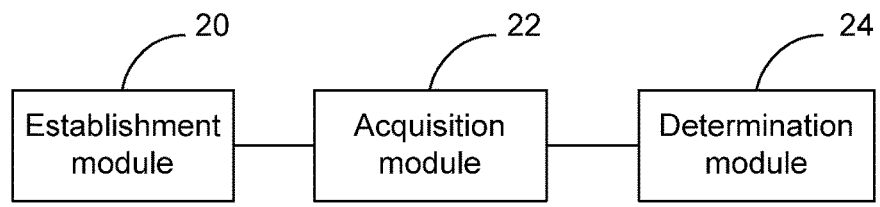
FIG. 2 is a schematic diagram illustrating the structure of an apparatus for determining a CQI value according to an embodiment of the disclosure.

An apparatus for determining a CQI value is also provided in an embodiment of the disclosure, and as shown in FIG. 2, the apparatus provided in the embodiment includes:

an establishment module 20 configured to establish a correspondence between an effective SNR threshold and a CQI value;

an acquisition module 22 configured to acquire a mean effective SNR in a downlink subframe specified bandwidth; and a determination module 24 configured to determine, according to the acquired mean effective SNR and the correspondence, a CQI to be sent to a base station.

In the embodiment of the disclosure, a terminal first establishes a correspondence between an effective SNR threshold and a CQI value and then acquires a mean effective SNR in a downlink subframe specified bandwidth and determines, according to the acquired mean effective SNR and the correspondence, a CQI value to be sent to a base station. The technical scheme for determining a CQI value provided in the embodiment of the disclosure is applicable to various different frequency selective fading channels and different signal transmission modes and can be implemented in a low-complexity way and therefore can meet a high-throughput data transmission requirement in an LTE system.

An LTE terminal is also provided in an embodiment of the disclosure which includes the foregoing apparatus for determining a CQI value.

The method for determining a CQI value provided herein is further described below with reference to specific embodiments.

In an Orthogonal Frequency Division Multiplexing (OFDM) based multi-carrier communication system, the SNR of each sub-carrier is different. As a wireless channel has a frequency selective fading characteristic in a multi-path channel, BLER is related to not only the mean SNR of the whole bandwidth but also the distribution of SNR on sub-carriers. For the same mean SNR, the BLERs corresponding to the channels averagely distributed in the frequency domain are relatively low. Thus, the SNR on a sub-carrier is mapped to an effective SNR having a determined correspondence with a BLER.

In multi-carrier transmission, the bits of one coding block are distributed on a certain number of sub-carriers which have different channel qualities. The error rate (BLER) of decoding is decided by the channel quality of sub-carriers having a relatively low SNR. The difference between a mean SNR and an SNR variance can be used to represent the SNR of sub-carriers of relatively poor channels and therefore can serve as an effective SNR to select a CQI.

3GPP specification defines, for LTE systems, 16 MCS combination schemes which are represented by CQI values 0-15. In the disclosure, an SNR-BLER relationship curve is simulated for each MCS. The correspondence between an SNR threshold and a CQI value is established by finding in each SNR-BLER curve an SNR value corresponding to a BLER equal to the maximum allowable BLER (the maximum BLER should be smaller than or equal to 0.1 according to requirements of the 3GPP specification), defining the found SNR value as an SNR threshold mapped to an MCS and then simulating the SNR threshold of each MCS in a similar way, and the correspondence is shown in the following Table 1:

TABLE 1

| CQI Value | Modulation mode | Coding rate*1024 | SNR threshold |
|---|---|---|---|
| 0 | | Out of range | |
| 1 | QPSK | 78 | 0.2655 |
| 2 | QPSK | 120 | 0.3399 |
| 3 | QPSK | 193 | 0.4779 |
| 4 | QPSK | 308 | 0.6607 |
| 5 | QPSK | 449 | 0.9742 |
| 6 | QPSK | 602 | 1.6423 |
| 7 | 16 QAM | 378 | 2.6198 |
| 8 | 16 QAM | 490 | 4.5663 |
| 9 | 16 QAM | 616 | 6.5682 |
| 10 | 64 QAM | 466 | 11.3162 |
| 11 | 64 QAM | 567 | 18.3124 |
| 12 | 64 QAM | 666 | 30.3886 |
| 13 | 64 QAM | 772 | 49.5151 |
| 14 | 64 QAM | 873 | 93.7396 |
| 15 | 64 QAM | 948 | 232.4627 |

In this way, when a mean effective SNR in the downlink subframe specified bandwidth is calculated, a corresponding CQI value can be acquired by searching Table 1, specifically, when the mean effective SNR is greater than effective SNR threshold M but smaller than effective SNR threshold N, the CQI value corresponding to the effective SNR threshold M is determined as a CQI value to be sent to a base station.

In the technical scheme of the embodiment of the disclosure, a mean effective SNR in a downlink subframe specified bandwidth is calculated through the following steps S1-3.

Step 1 includes that a mean SNR and a standard SNR deviation in the downlink subframe specified bandwidth are calculated;

specifically, when the terminal respectively employs a one-layer (including single transmitting antenna, multi-antenna transmit delivery and one-layer spatial multiplexing mode) transmission mode and a two-layer transmission mode (two-layer spatial multiplexing mode), SNR is calculated in different ways which are described below separately:

1) when the terminal is in a single transmitting antenna or multi-antenna transmit diversity (TxD) or one-layer spatial multiplexing mode, a mean SNR value in the ith downlink subframe specified bandwidth is calculated using the following formula:

$$meanSNR(i) = \frac{1}{A} \sum_{k,l \in K,L} \frac{\sum_{rx=0,tx=0}^{rx=N_{Rx}-1,tx=N_{Tx}-1} |h_{rx,tx}(i,k,l)|^2}{N_0} \quad \text{Formula 1}$$

a standard SNR deviation in the ith downlink subframe specified bandwidth is calculated using the following formula:

$$stdSNR(i) = \sqrt{\frac{1}{A} \sum_{k,l \in K,L} \left( \frac{\sum_{rx=0,tx=0}^{rx=N_{Rx}-1,tx=N_{Tx}-1} |h_{rx,tx}(i,k,l)|^2}{N_0} - meanSNR(i) \right)^2} \quad \text{Formula 2}$$

In the formulas above, $N_{Rx}$ the number of the receiving antennas of the terminal; $N_{Tx}$ represents the number of the transmitting antennas of a base station; $h_{rx,tx}(i,k,l)$ represents the channel coefficient on a (rx-tx) antenna pair of the kth sub-carrier on the lth Orthogonal Frequency Division Multiplexing (OFDM) symbol in the ith downlink sub-frame; K and L respectively represent a sub-carrier set and an OFMD symbol set for calculation in a downlink subframe specified bandwidth; and A represents the number of the sub-carriers for calculating a mean SNR and a standard SNR deviation in a downlink subframe specified bandwidth;

2) when the terminal is in a two-layer spatial multiplexing mode, and when a Minimal Mean Square Error (MMSE) receiver is used, the SNR of two-layer signals can be calculated using the following formula:

$$C = \begin{pmatrix} c_{00} & c_{01} \\ c_{10} & c_{11} \end{pmatrix} = (W^H H^H H W / N_0 + I)^{-1}$$

$$SNR_0 = 1/c_{00} - 1$$

$$SNR_1 = 1/c_{11} - 1$$

in which w is a pre-coded matrix of $N_{Tx}*N_L$, H is $N_{Rx}*N_{Tx}$ channel coefficient, $N_0$ is a noise power, I is a unit matrix, $SNR_0$ is the SNR value of the first layer of signals, $SNR_1$ is the SNR value of the second layer of signals. Here, $N_{Tx}$ is the number of the transmitting antennas on the side of a base station, $N_{Rx}$ the number of the receiving antennas on the side of the terminal, and $N_L$ is the number of the layers of signals.

For the ith downlink sub-frame, the mean SNR of each layer of signals is calculated using the following formula:

$$meanSNR(i) = \frac{1}{A} \sum_{k \in \Lambda} SNR_{l,k} \quad \text{Formula 3}$$

For the ith downlink sub-frame, the standard SNR deviation of each layer of signals is calculated using the following formula:

$$stdSNR(i) = \sqrt{\frac{1}{A}\sum_{k\in\wedge}(SNR_{l,k} - meanSNR(i))^2} \quad \text{Formula 4}$$

in which $\wedge$ represents a set of sub-carriers for calculating a mean SNR and a standard SNR deviation in a downlink sub-frame, the rank of $\wedge$ is A, and $SNR_{l,k}$ represents the SNR value of the lth layer in the kth sub-carrier, in which l=0,1.

Step 2 includes that an effective SNR, that is, $SNR_{eff}(i)$, in the downlink subframe specified bandwidth is calculated according to the acquired mean SNR meanSNR(i) and standard SNR deviation stdSNR(i):

$$SNR_{eff}(i) = meanSNR(i) - stdSNR(i) \quad \text{Formula 5}$$

Step 3 includes that the mean $\overline{SNR}(i)$ of the effective SNRs is calculated;

for a fast fading channel, by selecting a CQI value according to an effective SNR determined by a mean SNR and a standard SNR deviation, the change of the channel can be well tracked; for a slow shading channel, by selecting a CQI value according to an effective SNR determined by a mean SNR and a standard SNR deviation, the change of the channel can also be well tracked. This is because the change of a mean SNR is needed to be tracked in this case in order to select a relatively high (small) CQI value when the mean value is high (low).

However, for a channel weak in frequency selectivity, such as an Extended Pedestrian A (EPA) channel, the change of the channel cannot be well tracked by selecting a CQI value according to an effective SNR determined by a mean SNR and a standard SNR deviation, moreover, a CQI value beyond the support of the channel may be selected when the rate is high, that is because the channel capacity is a convex function (logarithmic function) of SNR, which results in that the capacity corresponding to a mean SNR is higher than the mean capacity of each SNR. However, a large SNR value has a great effect on calculation of the mean SNR in each subframe in the time domain, and BLER is 0 when the SNR is high to an extent, that is, the performance of BLER will not be improved any more. Thus, it may be set that an SNR threshold is $T_{SNR}$ when BLER is 0 and that high SNR values greater than $T_{SNR}$ are all $T_{SNR}$. A method for limiting mean SNR is determined in the embodiment, that is, the upper limit of each instantaneously measured subframe value is set to be higher than the current time domain average value by a certain proportion, meanwhile, to track the change of a channel without causing instant mutation, a loop filter is used in the time domain for smoothing. That is, a mean effective SNR represented as $\overline{SNR}(i)$ is calculated using the following formulas 6 and 7:

$$SNR_{eff}(i) = \min((1+scale)\cdot\overline{SNR}(i-1), SNR_{eff}(i)) \quad \text{Formula 6}$$

$$\overline{SNR}(i) = (1-\alpha)\cdot\overline{SNR}(i-1) + \alpha\cdot SNR_{eff}(i) \quad \text{Formula 7}$$

in which $\alpha$ and scale are constants.

By calculating a mean effective SNR $\overline{SNR}(i)$ of signals of each layer through the foregoing Step 1-Step 3, a CQI value corresponding to signals of each layer can be determined based on the pre-stored correspondence between SNR thresholds and CQI values. Specifically, when $\overline{SNR}(i)$ is greater than effective SNR threshold M but smaller than effective SNR threshold N, the CQI value corresponding to the effective SNR threshold M is determined as a CQI value to be sent to a base station.

When the terminal is in a multi-antenna spatial multiplexing mode, that is, in a two-layer signal mode, the mean SNR and the standard SNR deviation of the same kind of channels are accordingly increased when there are two layers of signals compared with when there is one layer of signals due to the influence of interference, even in the situation of the same MCS and BLER, however, there is an approximately fixed linear relationship between and an effective SNR threshold in the case of one-layer signals and an effective SNR calculated based on a mean SNR and a standard SNR deviation, that is, for the same CQI, $\overline{SNR}_{threshold} = \beta \cdot \overline{SNR}_{2layers}$, in which $\beta \approx 1.5$. Therefore, in a multi-antenna spatial multiplexing mode, a CQI value is selected by searching Table 1 after the mean effective SNR calculated through the foregoing Steps 1-3 is multiplied by) $\beta$, that is, $\overline{SNR}_{threshold} = \beta \cdot \overline{SNR}_{2layers}$, in which $\beta \approx 1.5$.

It should be noted that when in a two-layer spatial multiplexing mode, the terminal can determine, according to the effective SNR $SNR_{eff}(i)$, a mean effective SNR $\overline{SNR}(i)$ in the downlink subframe specified bandwidth using the following formulas 6, 7 and 8:

$$SNR_{eff}(i) = \min((1+scale)\cdot\overline{SNR}(i-1), SNR_{eff}(i)) \quad \text{Formula 6}$$

$$\overline{SNR}(i) = (1-\alpha)\cdot\overline{SNR}(i-1) + \alpha\cdot SNR_{eff}(i) \quad \text{Formula 7}$$

$$\overline{SNR}(i) = \beta\cdot\overline{SNR}(i) \quad \text{Formula 8}$$

in which scale, $\alpha$ and $\beta$ are constants.

The method for determining a CQI value provided herein is applicable to various different frequency selective fading channels and different signal transmission modes and can be implemented in a low-complexity way and therefore can meet a high-throughput data transmission requirement in an LTE system.

Many of the functional components described in the specification are referred to as modules, in order to more particularly emphasize their implementation independence.

In the disclosure, modules may be implemented by software so as to be executed by various types of processors. An identified module capable of executing codes may, for instance, include one or more physical or logical blocks of computer instructions which may, for instance, be organized as an object, process, or function. Nevertheless, the executable codes of the identified module need not be physically located together, but may include different instructions stored in different locations which, when combined logically together, constitute the module and achieve the stated purpose for the module.

Indeed, a module capable of executing codes could be a single instruction or multiple instructions, and may even be distributed on several different code segments, in different programs or across several memory devices. Similarly, operational data may be recognized within modules, and may be embodied in any suitable form and organized within any suitable type of data structure. The operational data may be collected as a single data set, or may be distributed over different locations (including in different storage devices), and may exist, at least partially, merely as electronic signals in a system or network.

If a module can be implemented by software, taking into consideration the level of existing hardware technology and regardless of cost, hardware circuits can be accordingly constructed for the module implemented as software to achieve corresponding functions, the hardware circuits including an ordinary Very Large Scale Integration (VLSI) circuit or a gate array or an existing semiconductor component such as a logic chip or a transistor or other discrete components. A module may also be achieved using a programmable hardware device, such as a field programmable gate array, programmable array logic or a programmable logic device.

In each embodiment of the method disclosed herein, the serial numbers of the steps cannot be used to define the execution sequence of the steps. For those of ordinary skill in the art, the modification of the execution sequence of the steps without making any creative effort should fall within the protection scope of the present disclosure.

The above mentioned is only embodiments, and it should be appreciated that various modifications and variations can be devised by those skilled in the art without departing from the scope of the present disclosure, and such modifications and variations should fall within the protection scope of the present disclosure.

The invention claimed is:

1. A method for determining a Channel Quality Indicator (CQI) value, comprising:
 establishing, by a terminal, a correspondence between an effective Signal-to-Noise Ratio (SNR) threshold and a CQI value;
 acquiring, by the terminal, a mean effective SNR in a downlink subframe specified bandwidth, wherein the acquiring, by the terminal, a mean effective SNR in a downlink subframe specified bandwidth comprises:
  calculating, by the terminal, a mean SNR and a standard SNR deviation in the downlink subframe specified bandwidth;
  calculating, by the terminal, an effective SNR in the downlink subframe specified bandwidth according to the mean SNR and the standard SNR deviation; and
  determining, by the terminal, the mean effective SNR in the downlink subframe specified bandwidth according to the effective SNR; and
 determining, by the terminal, a CQI value to be sent to a base station according to the acquired mean effective SNR and the correspondence.

2. The method according to claim 1, wherein when the terminal is in a single transmitting antenna or multi-antenna transmit diversity or one-layer spatial multiplexing mode, the terminal calculates the mean SNR represented as meanSNR(i) and the standard SNR deviation represented as stdSNR(i) in an ith downlink subframe specified bandwidth using following formulas 1 and 2:

$$meanSNR(i) = \frac{1}{A} \sum_{k,l \in K,L} \frac{\sum_{rx=0,tx=0}^{rx=N_{Rx}-1,tx=N_{Tx}-1} |h_{rx,tx}(i,k,l)|^2}{N_0} \qquad \text{Formula 1}$$

$$stdSNR(i) = \sqrt{\frac{1}{A} \sum_{k,l \in K,L} \left( \frac{\sum_{rx=0,tx=0}^{rx=N_{Rx}-1,tx=N_{Tx}-1} |h_{rx,tx}(i,k,l)|^2}{N_0} - meanSNR(i) \right)^2} \qquad \text{Formula 2}$$

wherein $N_{Rx}$ the number of receiving antennas of the terminal, $N_{Tx}$ represents the number of transmitting antennas of the base station, $h_{rx,tx}(i,k,l)$ represents a channel coefficient on a (rx-tx) antenna pair of a kth sub-carrier on an lth Orthogonal Frequency Division Multiplexing (OFDM) symbol in the ith downlink sub-frame; K and L respectively represent a sub-carrier set and an OFMD symbol set for calculation in a downlink subframe specified bandwidth, and A represents the number of sub-carriers for calculating a mean SNR and a standard SNR deviation in a downlink subframe specified bandwidth.

3. The method according to claim 2, wherein when the terminal is in a two-layer spatial multiplexing mode, the terminal calculates the meanSNR(i) and the stdSNR(i) in the ith downlink subframe specified bandwidth using following formulas 3 and 4:

$$meanSNR(i) = \frac{1}{A} \sum_{k \in \wedge} SNR_{l,k} \qquad \text{Formula 3}$$

$$stdSNR(i) = \sqrt{\frac{1}{A} \sum_{k \in \wedge} (SNR_{l,k} - meanSNR(i))^2} \qquad \text{Formula 4}$$

wherein × represents a set of sub-carriers for calculating the mean SNR and the standard SNR deviation in the ith downlink sub-frame, rank of × is A, and $SNR_{l,k}$ represents an SNR value of an lth layer in the kth sub-carrier, wherein l=0,1.

4. The method according to claim 2, wherein the terminal calculates, according to the meanSNR(i) and the stdSNR(i), the effective SNR represented as $SNR_{eff}(i)$ in the downlink subframe specified bandwidth using following formula 5:

$$SNR_{eff}(i) = meanSNR(i) - stdSNR(i) \qquad \text{Formula 5.}$$

5. The method according to claim 2, wherein when the terminal is in the single transmitting antenna or multi-antenna transmit diversity or one-layer spatial multiplexing mode, the terminal determines, according to the effective SNR represented as $SNR_{eff}(i)$, the mean effective SNR represented as $\overline{SNR}(i)$ in the downlink subframe specified bandwidth using following formulas 6 and 7:

$$SNR_{eff}(i) = \min((1+scale) \cdot \overline{SNR}(i-1), SNR_{eff}(i)) \qquad \text{Formula 6}$$

$$\overline{SNR}(i) = (1-\alpha) \cdot \overline{SNR}(i-1) + \alpha \cdot SNR_{eff}(i) \qquad \text{Formula 7}$$

wherein α and scale are constants.

6. The method according to claim 2, wherein when the terminal is in a two-layer spatial multiplexing mode, the terminal calculates, according to the effective SNR represented as $SNR_{eff}(i)$, the mean effective SNR represented as $\overline{SNR}(i)$ in the downlink subframe specified bandwidth using following formulas 6, 7 and 8:

$$SNR_{eff}(i) = \min((1+scale) \cdot \overline{SNR}(i-1), SNR_{eff}(i)) \qquad \text{Formula 6}$$

$$\overline{SNR}(i) = (1-\alpha) \cdot \overline{SNR}(i-1) + \alpha \cdot SNR_{eff}(i) \qquad \text{Formula 7}$$

$$\overline{SNR}(i) = \beta \cdot \overline{SNR}(i) \qquad \text{Formula 8}$$

wherein scale, α and β are constants.

7. The method according to claim 1, wherein the determining, by the terminal, a CQI value to be sent to a base station according to the acquired mean effective SNR and the correspondence comprises:
 determining, by the terminal, a CQI value corresponding to effective SNR threshold M as the CQI value to be sent to the base station, when the acquired mean effective SNR is greater than the effective SNR threshold M but smaller than effective SNR threshold N.

8. An apparatus for determining a channel quality indicator (CQI) value, comprising a processor, wherein the processor is configured to be capable of executing programming instructions stored in a memory to perform steps comprising:

establishing a correspondence between an effective Signal-to-Noise Ratio (SNR) threshold and a CQI value;

acquiring a mean effective SNR in a downlink subframe specified bandwidth, wherein the acquiring a mean effective SNR in a downlink subframe specified bandwidth comprises: calculating a mean SNR and a standard SNR deviation in the downlink subframe specified bandwidth; calculating an effective SNR in the downlink subframe specified bandwidth according to the mean SNR and the standard SNR deviation; and determining the mean effective SNR in the downlink subframe specified bandwidth according to the effective SNR; and determining, according to the acquired mean effective SNR and the correspondence, a CQI value to be sent to a base station.

9. A Long Term Evolution (LTE) terminal comprising an apparatus for determining a CQI value, where in the apparatus comprises a processor, wherein the processor is configured to be capable of executing programming instructions stored in a memory to perform steps comprising:

establishing a correspondence between an effective Signal-to-Noise Ratio (SNR) threshold and a CQI value;

acquiring a mean effective SNR in a downlink subframe specified bandwidth, wherein the acquiring a mean effective SNR in a downlink subframe specified bandwidth comprises: calculating a mean SNR and a standard SNR deviation in the downlink subframe specified bandwidth; calculating an effective SNR in the downlink subframe specified bandwidth according to the mean SNR and the standard SNR deviation; and determining the mean effective SNR in the downlink subframe specified bandwidth according to the effective SNR; and determining, according to the acquired mean effective SNR and the correspondence, a CQI value to be sent to a base station.

* * * * *